United States Patent
Kotani et al.

(10) Patent No.: US 8,267,217 B2
(45) Date of Patent: Sep. 18, 2012

(54) SWIVEL FRAME

(75) Inventors: Satoru Kotani, Itami (JP); Kenichi Saiki, Sakai (JP); Kenzo Kusama, Sakai (JP); Sho Ikeda, Sakai (JP)

(73) Assignee: Kubota Corporation, Osaka (JP)

( * ) Notice: Subject to any disclaimer, the term of this patent is extended or adjusted under 35 U.S.C. 154(b) by 137 days.

(21) Appl. No.: 12/886,875

(22) Filed: Sep. 21, 2010

(65) Prior Publication Data
US 2011/0074182 A1   Mar. 31, 2011

(30) Foreign Application Priority Data

Sep. 29, 2009 (JP) ................................ 2009-224700
Oct. 28, 2009 (JP) ................................ 2009-247718
Nov. 20, 2009 (JP) ................................ 2009-265280

(51) Int. Cl.
*B60R 21/00* (2006.01)

(52) U.S. Cl. ........................................ 180/312; 280/781

(58) Field of Classification Search .................. 37/395, 37/397, 443; 180/89.13, 311, 312, 327; 280/760, 280/781, 782, 783, 795; 296/190.01, 190.04, 296/190.08, 193.07
See application file for complete search history.

(56) References Cited

U.S. PATENT DOCUMENTS

| | | | |
|---|---|---|---|
| 6,499,556 B1 * | 12/2002 | Koyama | 180/311 |
| 7,188,865 B2 * | 3/2007 | Sugiyama et al. | 280/759 |
| 7,204,047 B2 * | 4/2007 | Murakami | 37/347 |
| 7,431,383 B2 * | 10/2008 | Katayama et al. | 296/190.08 |
| 7,500,532 B2 * | 3/2009 | Koga et al. | 180/89.13 |
| 7,503,419 B2 * | 3/2009 | Miyake | 180/327 |
| 7,717,218 B2 * | 5/2010 | Matsumoto et al. | 180/291 |
| 7,987,942 B2 * | 8/2011 | Lee | 180/312 |
| 2005/0204590 A1 * | 9/2005 | Takano et al. | 37/347 |
| 2007/0018484 A1 * | 1/2007 | Lee | 296/190.08 |

FOREIGN PATENT DOCUMENTS

| | | | |
|---|---|---|---|
| JP | 2000-027235 A1 * | 1/2000 | |
| JP | 2003-041626 A1 * | 2/2003 | |
| JP | 2005105605 A | 4/2005 | |
| JP | 2006143004 A | 6/2006 | |
| JP | 2006144389 A | 6/2006 | |

* cited by examiner

Primary Examiner — Joseph Rocca
(74) Attorney, Agent, or Firm — The Webb Law Firm

(57) ABSTRACT

A swivel frame for a swivel work machine includes a swivel base plate supported on a traveling machine body to be pivotable about a swivel axis and mounting an engine at a rear portion thereof, a support bracket provided at a front end of the swivel base plate for supporting an excavator, a partition wall provided on the swivel base plate for partitioning space forwardly of the engine in the fore/aft direction, and a pair of right and left vertical ribs provided on the swivel base plate for interconnecting the support bracket and the partition wall. The swivel base plate is divided into a rear plate portion on the rear side thereof and a front plate portion on the front side thereof, the rear plate portion being formed of a plate thinner than the front plate portion. The rear plate portion and the front plate portion are fixedly connected to each other in such in a manner that upper surfaces thereof are flush each other. A rear portion of the front plate portion projects more rearward than the partition wall. A pair of vertical walls are formed on and project from the rear plate portion. Front portions of the pair of vertical walls project more forward than the rear plate portion and are fixedly attached to the rear portion of the front plate portion and the partition wall.

4 Claims, 10 Drawing Sheets

SWIVEL FRAME

TECHNICAL FIELD

The present invention relates to a swivel frame for a swivel work machine.

BACKGROUND ART

A known swivel frame for a swivel work machine such as a backhoe includes a swivel base plate supported on a traveling machine body to be pivotable about a swivel axis and mounting an engine at a rear portion thereof. At a front end of the swivel base plate, a support bracket projects forwardly to support an excavator. On the swivel base plate, there is provided a partition wall which partitions the space forwardly of the engine in the fore/aft direction. Further, on the swivel base plate, there are provided a pair of right and left vertical ribs that interconnect the support bracket and the partition wall (see e.g. Japanese Patent Application "Kokai" No. 2006-144389 and Japanese Patent Application "Kokai" No. 2006-143004). In the swivel frame of this conventional type of swivel work machine, the swivel base plate is constituted of a single plate member having a uniform thickness throughout.

SUMMARY OF THE INVENTION

Therefore, in the conventional technique, the swivel base plate was normally used principally as a reinforcing member, hence being formed of a thick plate. As the plate was thick throughout even at its portions which actually need not be formed thick for reinforcement, the weight was large and the manufacturing cost was high. The present invention has been made in view of the above-described problem.

According to the present invention, a swivel frame for a swivel work machine, comprises:

a swivel base plate supported on a traveling machine body to be pivotable about a swivel axis and mounting an engine at a rear portion thereof;

a support bracket provided at a front end of the swivel base plate for supporting an excavator;

a partition wall provided on the swivel base plate for partitioning space forwardly of the engine in the fore/aft direction; and a pair of right and left vertical ribs provided on the swivel base plate for interconnecting the support bracket and the partition wall;

wherein said swivel base plate is divided into a rear plate portion on the rear side thereof and a front plate portion on the front side thereof, the rear plate portion being formed of a plate thinner than the front plate portion;

said rear plate portion and said front plate portion are fixedly connected to each other in such in a manner that upper surfaces thereof are flush each other;

a rear portion of said front plate portion projects more rearward than said partition wall;

a pair of vertical walls are formed on and project from said rear plate portion; and front portions of said pair of vertical walls project more forward than said rear plate portion and are fixedly attached to the rear portion of said front plate portion and said partition wall.

Preferably, in the above-described construction, a rear end of said rear plate portion is bent to form an erect wall, to which rear ends of said vertical walls are fixedly attached.

Preferably, in the above-described construction, at front and rear opposed ends of said pair of right and left vertical walls, there are formed engine mounting portions, with a front end of the front engine mounting portion being fixedly attached to said partition wall and with a rear end of the rear engine mounting portion being fixedly attached to said erect wall.

Preferably, in the above-described construction, a connecting portion of the left vertical rib to be connected to said partition wall and a fixedly attaching portion of the engine mounting portion of the left vertical wall to be fixedly attached to said partition wall are overlapped with each other in the right/left direction; and a connecting portion of the right vertical rib to be connected to said partition wall and a fixedly attaching portion of the engine mounting portion of the right vertical wall to be fixedly attached to said partition wall are overlapped with each other in the right/left direction.

MODE OF EMBODYING THE INVENTION

Next, embodiments of the present invention will be described with reference to the accompanying drawings.

Figure 6:
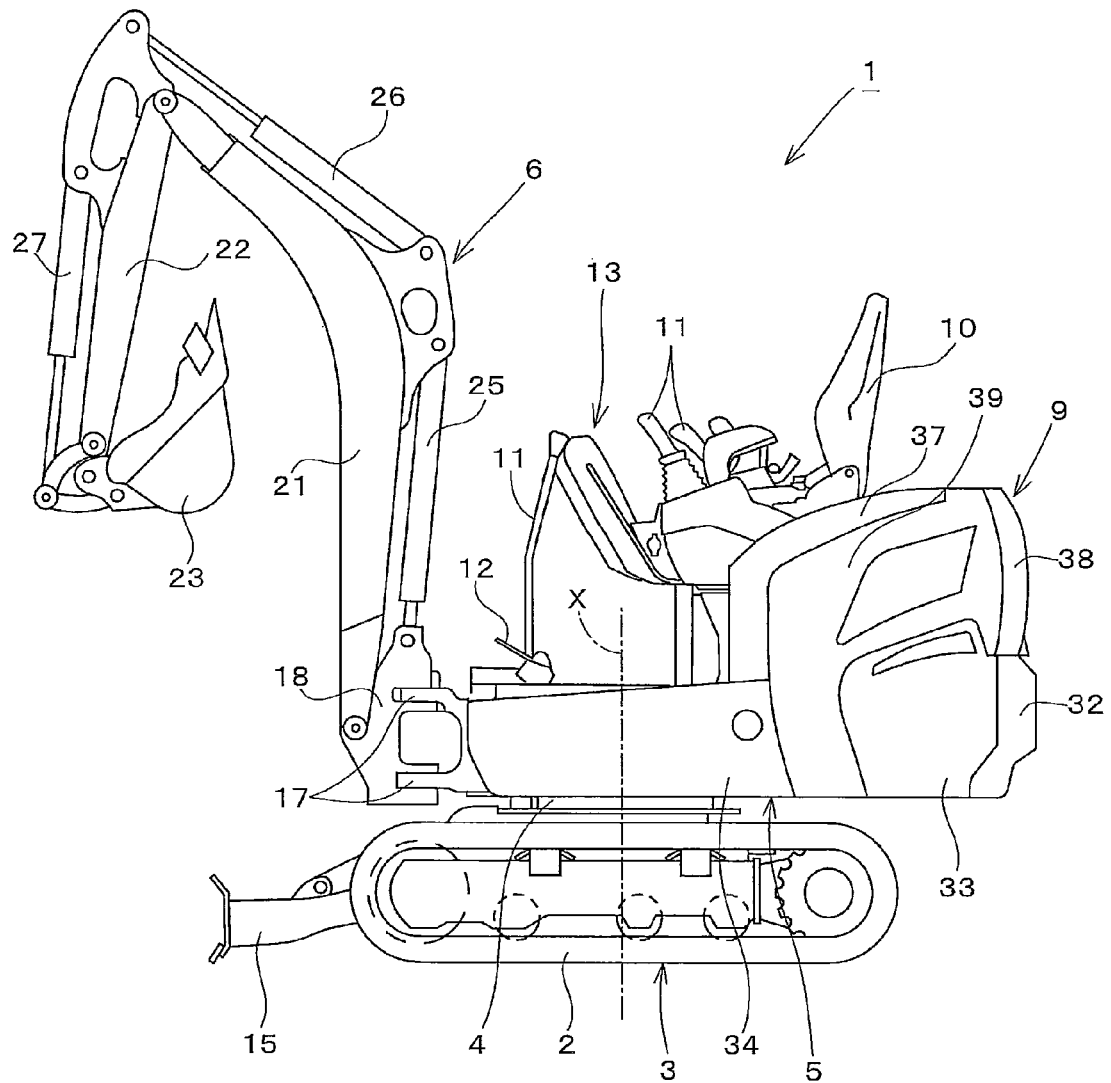
FIG. 6 is a side view of a backhoe.

In FIG. 6, in a swivel work machine 1, which is a backhoe, a traveling device 3 having a pair of right and left crawler traveling bodies 2 mounts thereon a swivel deck 5 that is swivellable about a vertical swivel axis X via a swivel bearing 4. At the front end of this swivel deck 5, there is attached an excavator 6.

On a rear portion of the swivel deck 5, there is mounted a hood 9, forwardly of which there is provided a maneuvering section 13 having a driver's seat 10, a maneuvering lever 11, a maneuvering pedal 12, etc. Incidentally, on the swivel deck 5, a rollover protection device such as a ROPS, or a cabin is mounted to surround the maneuvering section 13.

Forwardly of the traveling device 3, a dozer 15 is provided. At a front portion of the swivel deck 5, there are provided a pair of upper and lower support brackets 17 comprised of plate members configured to support the excavator 6.

The excavator 6 includes a swing bracket 18 supported to the upper and lower support brackets 17 to be pivotable to the right and left about a vertical axis, a boom 21 having a base portion connected to the swing bracket 18 to be vertically pivotable about a right/left axis, an arm 22 connected to the leading end of the boom 21 to be pivotable in the fore/aft direction about a right/left axis, and a bucket 23 pivotally connected to the leading end of this arm 22 to be pivotable about a right/left axis.

The swing bracket 18 is pivotable in response to expansion/contraction of a swing cylinder disposed on the right side within the swivel deck 5. The boom 21 is pivotable in response to expansion/contraction of a boom cylinder 25 interposed between the boom 21 and the swing bracket. The bucket 23 is pivotable in response to expansion/contraction of a bucket cylinder 27 interposed between the bucket 23 and the arm 22. The swing cylinder, the boom cylinder 25, the arm cylinder 26 and the bucket cylinder 27 are comprised of hydraulic cylinders.

As shown in FIG. 1 through FIG. 5, the swivel deck 5 includes a swivel frame 31 acting as a framework, a protector rear portion 32 (see FIG. 6) fixedly attached to the rear portion of the swivel frame 31 and constituting the rear portion of the swivel deck 5, and a pair of right and left protector side portions 33 provided on the right and left opposed sides of the protector rear portion 32 and constituting the rear portion of the swivel deck 5 together with the protector rear portion 32. The right and left sides of the swivel deck 5 are covered with cover members 34 and the front face of the deck is covered with another cover member.

Figure 1:
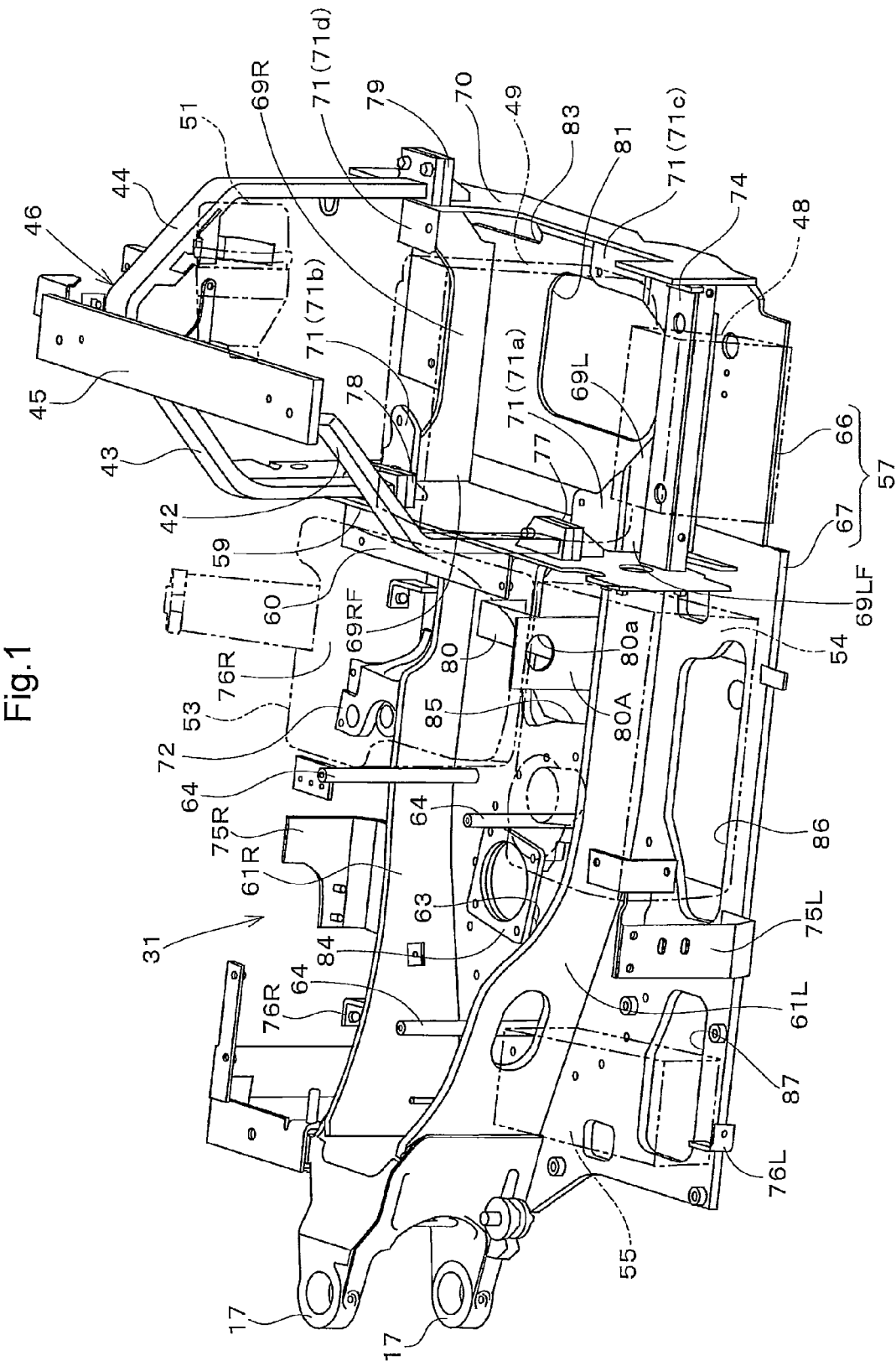
FIG. 1 is a perspective view showing a first embodiment of the invention, showing a swivel frame portion as viewed from the left upper side thereof.
Figure 2:
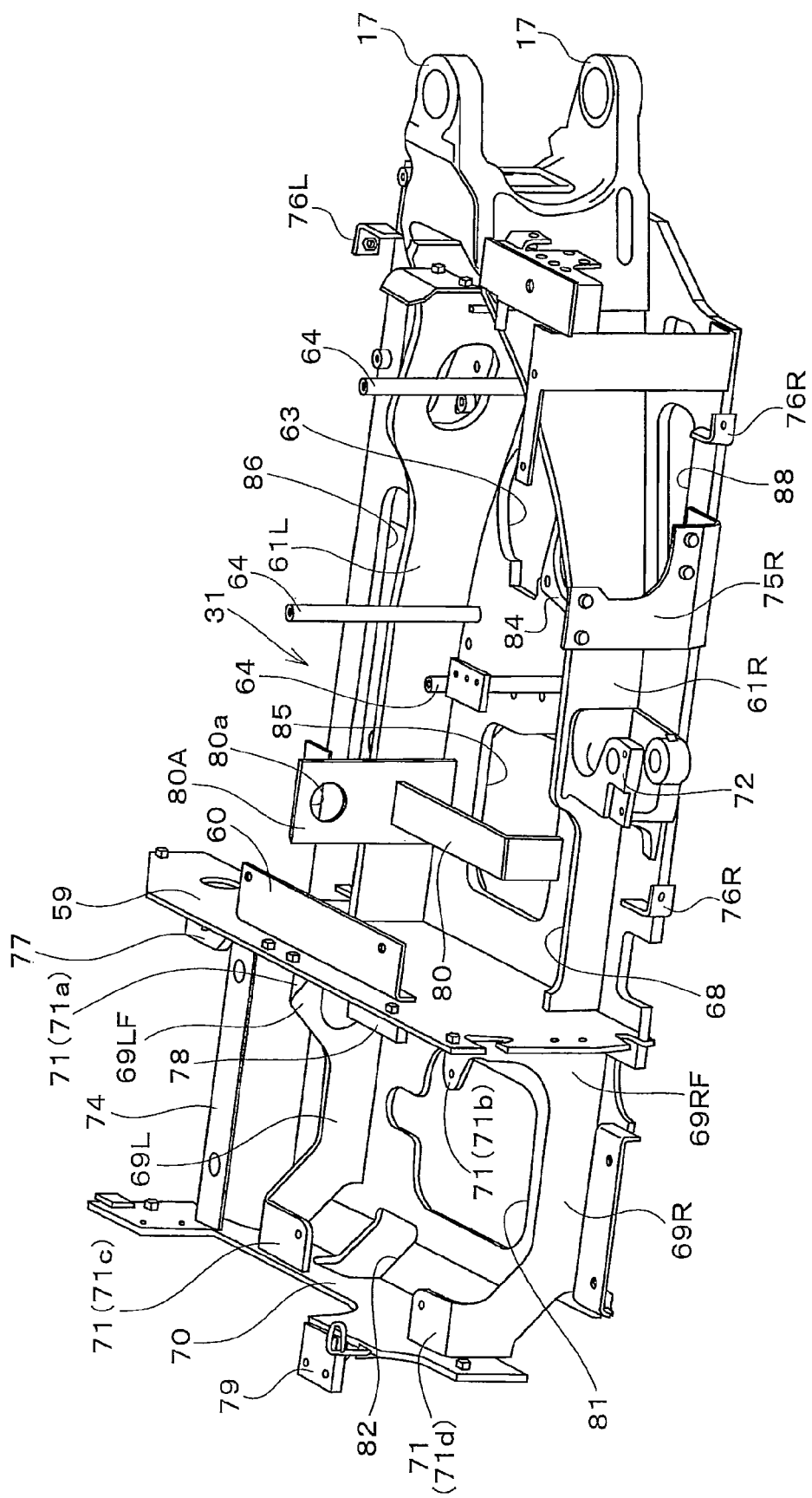
FIG. 2 is a perspective view showing the swivel frame portion as viewed from the right upper side thereof.
Figure 3:
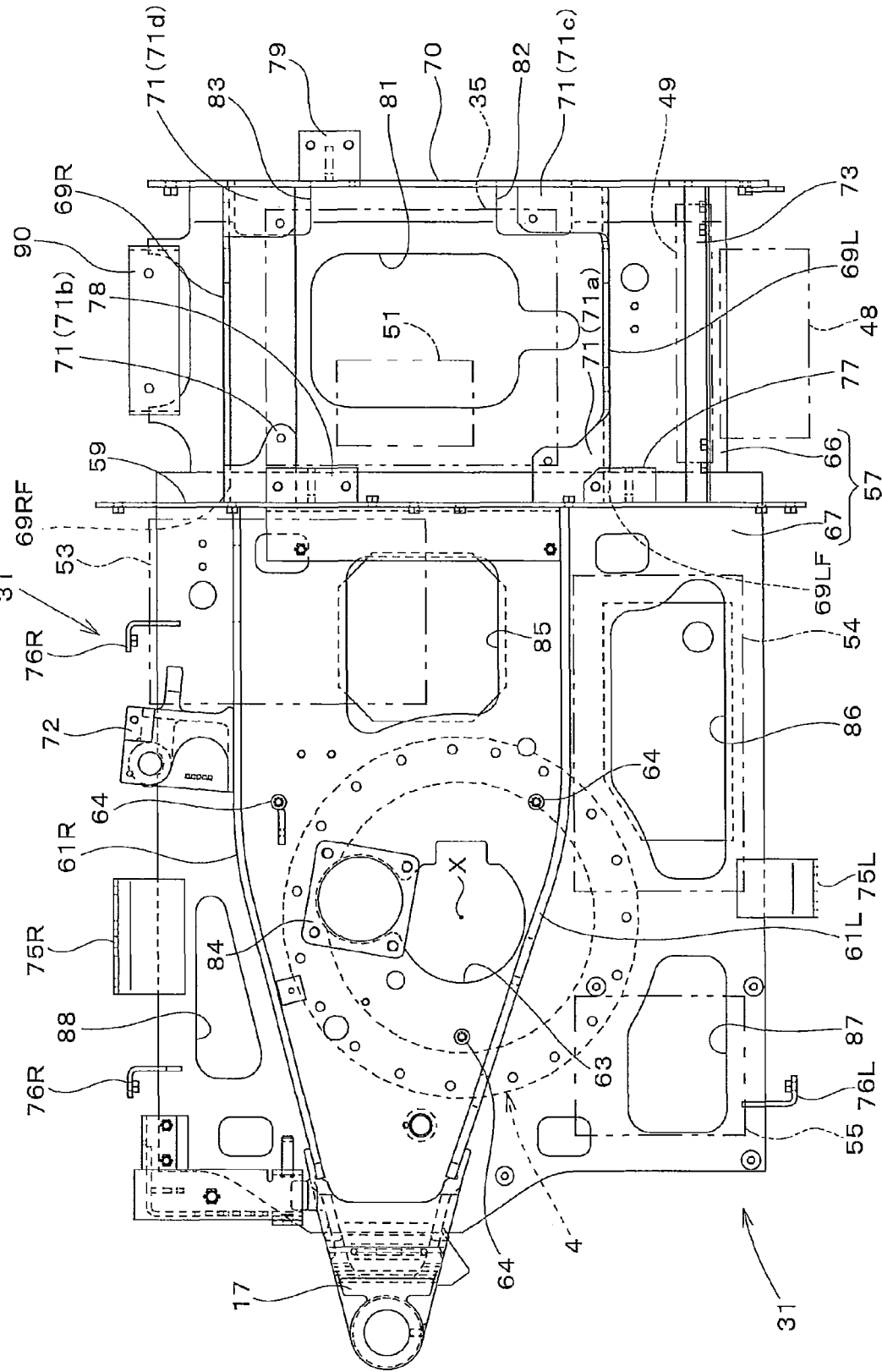
FIG. 3 is a plane view showing the swivel frame portion.
Figure 4:
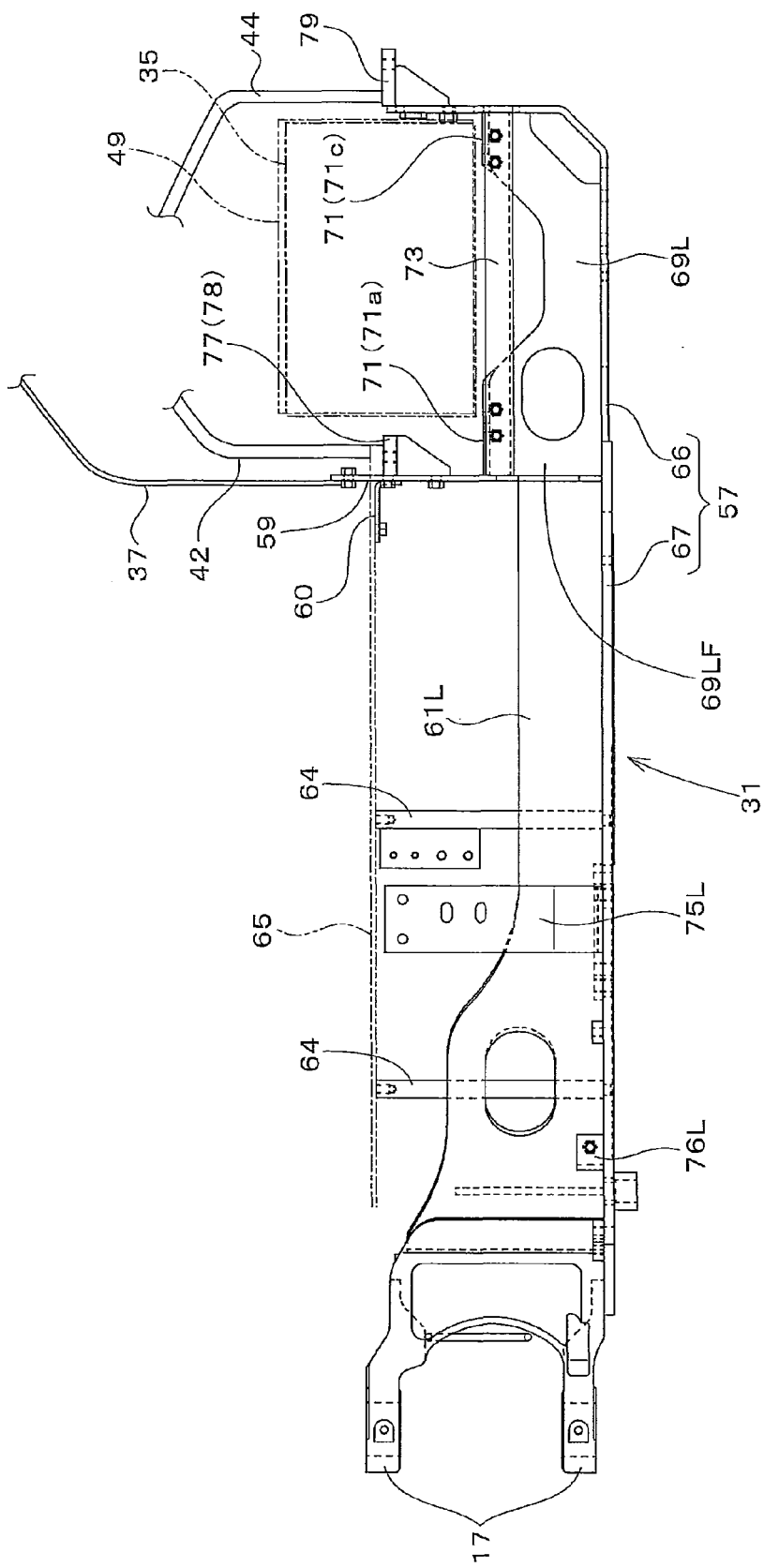
FIG. 4 is a left side view showing the swivel frame portion.

As shown in FIG. 3, rearwardly of the swivel deck 5, an engine room is formed, and on a rear portion of the swivel frame 31, an engine 35 is mounted.

As shown in FIG. 6, a hood 9 covers the engine 35. This hood 9 includes a front cover 37 which partitions between the engine 35 and the driver's seat 10 disposed forwardly of the engine 35 and covers the engine 35 from above, a hood rear portion 38 which is disposed upwardly of the protector rear portion 32 and covers the rear side of the engine 35, and a pair of right and left hood side portions 39 which are disposed upwardly of the protector side portions 33 and cover the side portions of the engine 35.

As shown in FIG. 1 through FIG. 5, inside the hood 9, a support frame 46 having legs 42, 43, 44 and an upper plate 45 is disposed in such a manner as to bridge over the engine 35. A battery 48 is mounted at a rear left side of the swivel frame 31 inside the hood 9. A radiator 49, etc. are disposed on the right side of the battery 49. An air cleaner 51 is disposed upwardly of the engine 35.

Further, on the swivel frame 31, there are mounted the driver's seat 10, a fuel tank 53, a work oil tank 54, a control valve 55, etc. The control valve 55 comprises interconnected assembly of control valves for controlling various hydraulic instruments provided in the swivel work machine 1.

The swivel frame 31 includes a swivel base plate 57 comprised of a plate member constituting a bottom wall of the swivel deck 5, the pair of upper and lower support brackets 17 projecting forwardly from the front end of the swivel base plate 57 and supporting the excavator 6, a partition wall 59 partitioning the space forwardly of the engine 35 in the fore/aft direction, and a pair of right and left vertical ribs 61L, 61R provided on the swivel base plate 57 for interconnecting the support bracket 17 and the partition wall 59. The pair of vertical ribs 61L, 61R are disposed in such a manner that a distance between the respective front sides thereof progressively increases from the support bracket 17 to an intermediate portion on the rear side and the respective rear sides thereof extend parallel with each other rearward and the rear ends thereof are fixedly attached to the partition wall 59 by means of welding or the like.

To the upper end portion of the partition wall 59, the lower end portion of the front cover 37 is fixedly connected. Further, at an upper portion of the partition wall 59, there is formed a step attaching plate 60 projecting forwardly therefrom. A rear end portion of a step 65 is fixedly attached to the step attaching plate 60 and is fixedly mounted on a plurality of step supporting cylindrical bodies 64. As shown by chain lines in FIG. 4, the step 65 is disposed upwardly of the swivel base plate 57.

On the swivel base plate 57 and forwardly of the fuel tank 53, there is provided a cylinder attaching portion 72 for the swing cylinder. On the opposed lateral sides of the swivel base plate 57, the are provided attaching plates 75L, 75R and attaching pieces 76L, 76R, via which the right and left side cover members 34 of the swivel frame 31 are attached. On the swivel base plate 57 and forwardly of the step attaching plate 60, there are provided a tank attaching plate 80 for receiving and supporting the fuel tank 53 and a position setting portion 80A for setting the position of the fuel tank 53 in the left direction and the fore/aft direction at the back side thereof.

The fuel tank 53 is detachably inserted from the right side of the swivel deck 5 and is mounted on the tank attaching plate 80 and the projecting portion at the back side thereof is engaged in a hole 80a defined in the position setting member 80A and prevented against inadvertent withdrawal thereof by a stopper tool (not shown). At a rear upper portion of the right vertical rib 61, there is formed a receiving recess portion 68 for receiving and supporting the right side portion of the fuel tank 53. Incidentally, the work oil tank 54 is disposed on the left side of the front plate portion 67 and on the left side relative to the left vertical rib 61L. Instead, this disposing may be replaced with the disposing of the fuel tank 53.

The swivel base plate 57 is supported to the traveling device 3 via the swivel bearing 4 to be pivotable about the vertical swivel axis X. Further, at the swivel center of the swivel base plate 57, there is formed a circular insertion hole 63 through which the upper portion of the swivel joint is to be inserted. The swivel joint feeds pressure oil from the control valve 55 on the swivel deck 5 side to the hydraulic instruments on the traveling device 3 side. On the right side of the insertion hole 63, there is provided a swivel motor attaching portion 84.

The swivel base plate 57 is divided, on its rear side and its front side, between a rear plate portion 66 and a front plate portion 67. The rear plate portion 66 is formed of a plate thinner than the front plate portion 67 and is fixedly connected to the front plate portion 67 in such a manner that the upper surfaces thereof are flush with each other.

The swivel base plate 57 has an approximately rectangular shape in its plane view, and on its upper surface, there are provided erect, such components as the support bracket 17, the vertical ribs 61L, 61R, the cylinder attaching portion 72, etc. And, to the lower surface, the swivel bearing 4 is fixedly attached. Thus, the swivel base plate 57 is constructed as a sturdy structure for supporting the load from the excavator 6.

The rear portion of the front plate portion 67 of the swivel base plate 57 projects more rearwardly than the partition wall 59, and the lower end of the partition wall 59 is fixedly attached to the rear portion of the front plate portion 67 by means of welding or the like. On the rear plate portion 66 of the swivel base plate 57, the right and left vertical walls 69L, 69R project and front portions 69LF, 69RF of the pair of vertical walls 69L, 69R project more forwardly than the front edge of the rear plate portion 66 and are fixedly attached to the rear portion of the front plate portion 67 and the partition wall 59 by means of welding or the like.

The rear end of the rear plate portion 66 is bent upward to form an erect wall 70 as an erect portion, to which the rear ends of the pair of vertical walls 69L, 69R are fixedly attached by means of welding or the like.

The erect wall 70 is disposed parallel with the partition wall 59, and the vertical walls 69L, 69R too are disposed parallel with each other, so that these members together constitute a framework having a square shape in its plane view and is fixedly attached from the rear plate portion 66 to the front plate portion 67.

At the front and rear opposed ends of the pair of right and left vertical walls 69L, 69R, there are formed engine mounting portions 71 (a left front engine mounting portion 71a, a right front engine mounting portion 71b, a left rear engine mounting portion 71c, a right rear engine mounting portion 71d). Each engine mounting portion 71 is formed of an upper end portion of the vertical wall 69L, 69R bent inward in the right/left direction. The front ends of the front engine mounting portions 71a, 71b are fixedly attached to the partition wall 59 by means of welding or the like. The rear ends of the rear engine mounting portions 71c, 71d are fixedly attached to the erect wall 70 by means of welding or the like. The engine 35 is fixedly mounted on the four engine mounting portions 71.

The protector rear portion 32 is disposed so as to cover the rear side of the erect wall 70 and the protector rear portion 32 is fixed to the erect wall 70 by means of a fastener or the like. As shown by the chain lines in FIG. 5, on the opposed lateral sides of the protector rear portion 32, the protector side portions 33 are disposed. The right projector side portion 33 is attached to a fixed rack 90 which is fixed to the right end of the rear plate portion 66 whereas the left protector side portion 33 is openable and closable for allowing inspection of the battery 48, the radiator 49.

As shown in FIG. 3, the connecting portion of the rear end of the left vertical rib 61L (i.e. the fixedly attaching portion by means of welding or the like) and the fixedly attaching portion of the left engine mounting portion 71a of the left vertical wall 69L to the partition wall 59 are overlapped with each other in the right/left direction. And, the connecting portion of the rear end of the right vertical rib 61R (i.e. the fixedly attaching portion by means of welding or the like) and the fixedly attaching portion of the right engine mounting portion 71b of the right vertical wall 69R to the partition wall 59 are overlapped with each other in the right/left direction.

Figure 5:
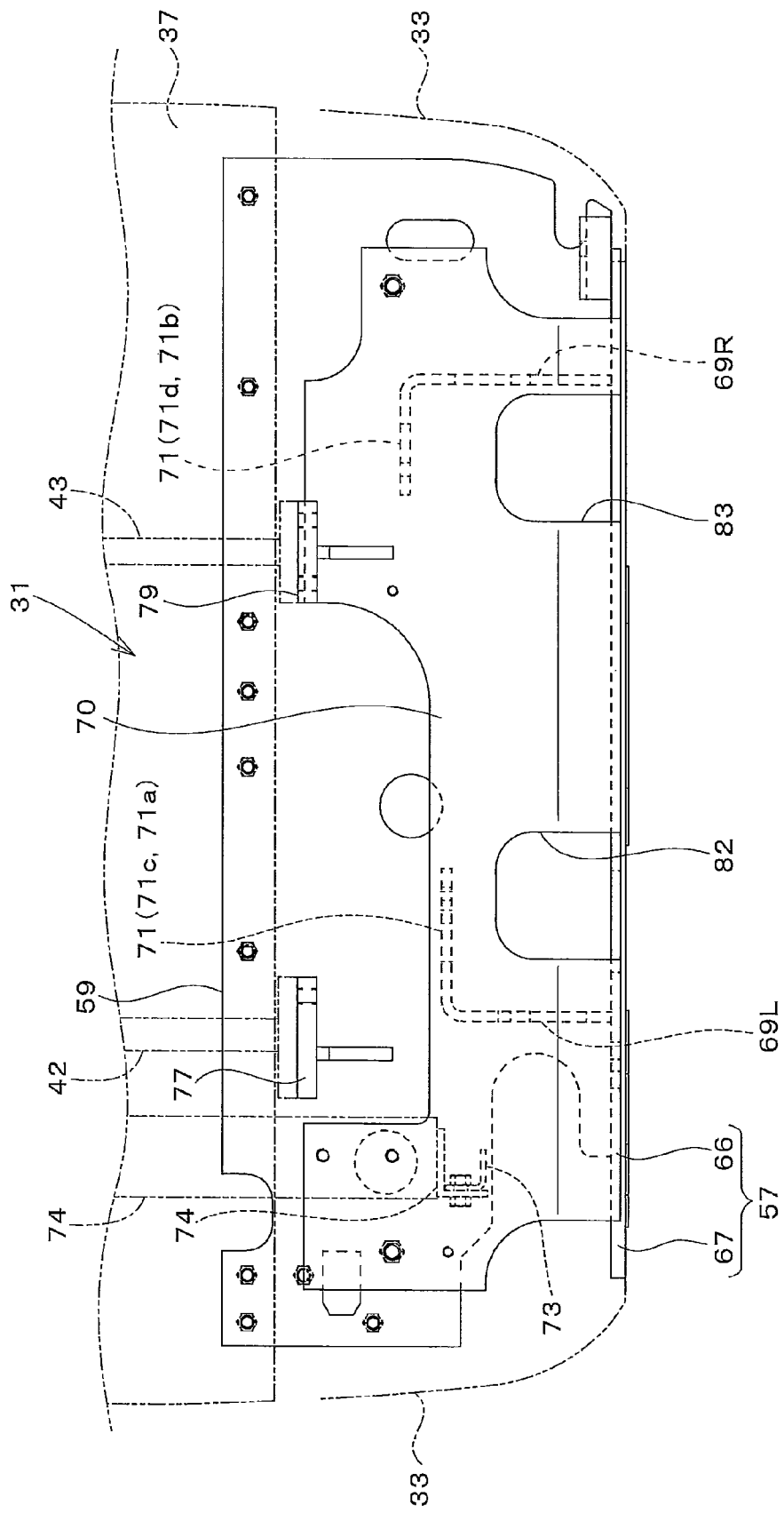
FIG. 5 is a rear view showing the swivel frame portion.

As shown in FIG. 5, to the left outer side of the left vertical wall 69L, there is provided an attaching rod 73 and this attaching rod 73 is connected and fixed between the partition wall 59 and the erect wall 70 upwardly of the swivel base plate 57. And, to this attaching rod 73, a radiator mounting rack 79 is fixed by means of a fastener such as a bolt. And, on this radiator mounting rack 79, the radiator 49 is mounted.

As shown in FIG. 1 through FIG. 5, from the rear face of the partition wall 59, there are formed a pair of right and left leg mounting racks 77, 78 projecting rearward therefrom. And, from the erect wall 70, a rear leg mounting rack 79 is formed to project rearward therefrom. The lower ends of the legs 42, 43 of the support frame 46 are fixed respectively to the pair of front leg mounting racks 77, 78 by means of fasteners such as bolts. And, the lower end of the leg 44 of the support frame 46 is fixed to the rear leg mounting rack 79 by means of fasteners such as bolts.

The upper ends of the three legs 42, 43, 44 are fixed to the lower face of the upper plate 45, thus providing attaching of the rear upper portion of the front cover 37 and the attaching of the pivot shaft for the front upper portion of the hood rear portion 38. Moreover, the upper plate 45 functions as a mounting rack for the ROPS or a mounting rack for the rear portion of the cabin.

The rear plate portion 66 of the swivel base plate 57 defines an opening 81 at a position corresponding to the engine 35 and at the rear end portion of the rear plate portion 66, there are provided a pair of right and left openings 82, 83 extending through to the erect wall 70. Further, in the front plate portion 67 of the swivel base plate 57, in addition to the insertion hole 63 described hereinbefore, there are provided openings 85, 86, 87, 88 at positions corresponding respectively to the fuel tank 53, the work oil tank 54, and the control valve 55. With these openings, the weight of the swivel base plate 57 is reduced. These openings 85, 86, 87, 88 may be closed with a thin plate from the lower sides thereof.

According to the foregoing embodiment, the swivel base plate 57 is divided at its rear side and its front side, between the rear plate portion 66 and the front plate portion 67 and the rear plate portion 66 is formed of a plate thinner than the front plate portion 67 and is fixedly connected thereto in such a manner that the upper surfaces thereof are flush with each other. By forming the rear plate portion 66 of the swivel base plate 57 of a thin plate, the weight of the component can be reduced and also the manufacture cost can be reduced. Moreover, the rear portion of the rear plate portion 67 of the swivel base plate 57 projects more rearward than the partition wall 59 and on the rear plate portion 66 of the swivel base plate 57, the pair of right and left vertical walls 69L, 69R are formed to project rearward therefrom. And, the front portions of the pair of vertical walls 69L, 69R project more forwardly than the rear plate portion 66 and are fixedly attached to the rear portion of the front plate portion 67 and to the partition wall 59. Therefore, with the connection between the rear plate portion 66 and the front plate portion 67 and the fixed attachment of the pair of vertical walls 69L, 69R to the rear portion of the front plate portion 67 and to the partition wall 59, the connection and fixing between the rear plate portion 66 side and the front plate portion 67 side can be rendered strong.

Further, from the rear end of the rear plate portion 66, the erect wall 70 is formed as an upwardly bent portion and the rear ends of the pair of vertical walls 69L, 69R are fixedly attached to the erect wall 70. Therefore, simultaneously with the fixed attachment of the front portions of the pair of vertical walls 69L, 69R projecting from the rear plate portion 66 to the front plate portion 67 and the partition wall 59, the rear ends of the pair of vertical walls 69L, 69R are fixedly attached to the erect wall 70 formed integral with the rear plate portion 66. Therefore, the rear portion of the swivel base plate 57 can be further reinforced.

Further, the engine mounting portions 71 are formed at the front and rear end portions of the pair of right and left vertical walls 69L, 69R and the front ends of the front engine mounting portions 71a, 71b are fixedly attached to the partition wall 59 and the rear ends of the rear engine mounting portions 71c, 71d are fixedly attached to the erect wall 70. Therefore, the pair of vertical walls 69L, 69R can be fixedly attached to the partition wall 59 and the erect wall 70 via the engine mounting portions 71. Thus, through the effective utilization of the engine mounting portions 71, the rear portion of the swivel base plate 57 can be further reinforced.

Moreover, the connecting portion of the rear end of the left vertical rib 61L to the partition wall 59 and the fixedly attaching portion of the left vertical wall 69L to the partition wall 59 of the engine mounting portion 71a are overlapped with each other in the right/left direction, and the connecting portion of the rear end of the right vertical rib 61R to the partition wall 59 and the fixedly attaching portion of the right vertical wall 69R to the partition wall 59 of the engine mounting portion 71b are overlapped with each other in the right/left direction. Therefore, via the partition wall 59, the rear end of the left vertical rib 61L and the left engine mounting portion 71a and the left vertical wall 69L can be fixedly connected to each other. And, via the partition wall 59, the rear end of the right vertical rib 61R and the right engine mounting portion 71b and the right vertical wall 69R can be fixedly connected to each other. Thus, the connecting and fixing between the rear plate portion 66 side and the front plate portion 67 side can be further reinforced.

OTHER EMBODIMENTS

Figure 7:
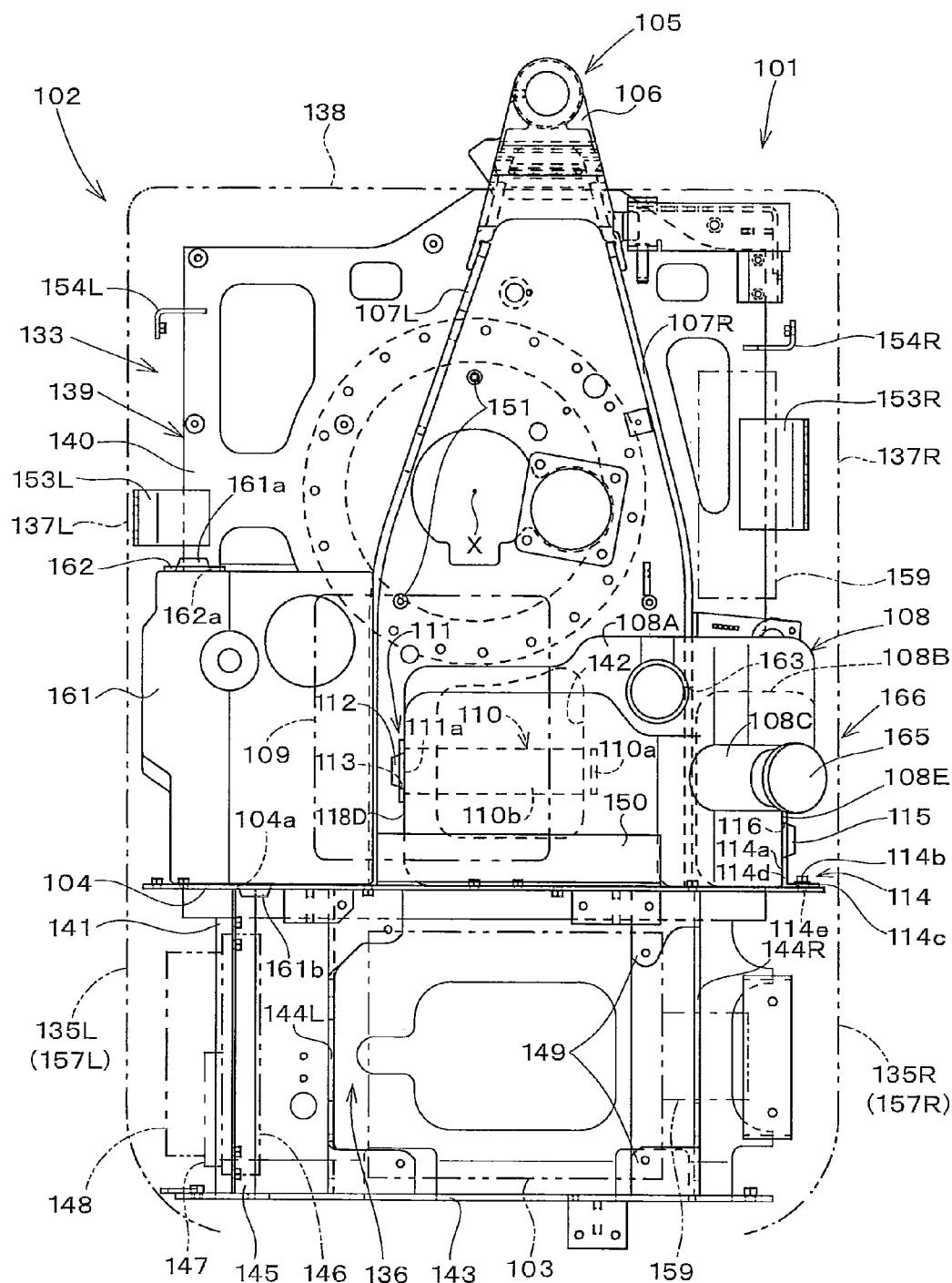
FIG. 7 is a plane view showing a swivel deck of a swivel work machine relating to a further embodiment.

As shown in FIG. 7, a swivel frame 133 mounts, forwardly of a partition wall 104, a fuel tank ("tank") 108, a control valve 160, a work oil tank 161, etc.

As shown in FIGS. 7-10, the fuel tank 108 is mounted on one (right side) of the right and left sides of the swivel frame 133. And, forwardly of this fuel tank 108 and on the right side of the swivel frame 133, the control valve 160 is disposed and on the left side of the fuel tank 108 (that is, on the other side of the right and left sides of the swivel frame 133), the work oil tank 161 is disposed, respectively.

Incidentally, the control valve 160 comprises interconnected assembly of control valves for controlling various hydraulic instruments provided in a swivel work machine 101, such as a ground work implement 105, a traveling device 122, etc. Further, when a right side cover 137R is detached, the control valve 160 is exposed at a position where inspection and replacement thereof are possible.

The work oil tank 161 includes projecting portions 161a, 161b in its front and rear faces. The front projecting portion 161a comes into engagement with a front engaging hole 162a defined in a stopper plate 162 which is disposed erect at the left end of the swivel base plate 139, the front engaging hole 162 being formed at a position in contact with the tank front face. The rear projecting portion 161b comes into engagement with a rear engaging hole 104a defined in a left portion of a partition wall 104 which portion contacts the tank rear face. With these engagements, the work oil tank 161 is attached to the swivel frame 133.

Figure 8:
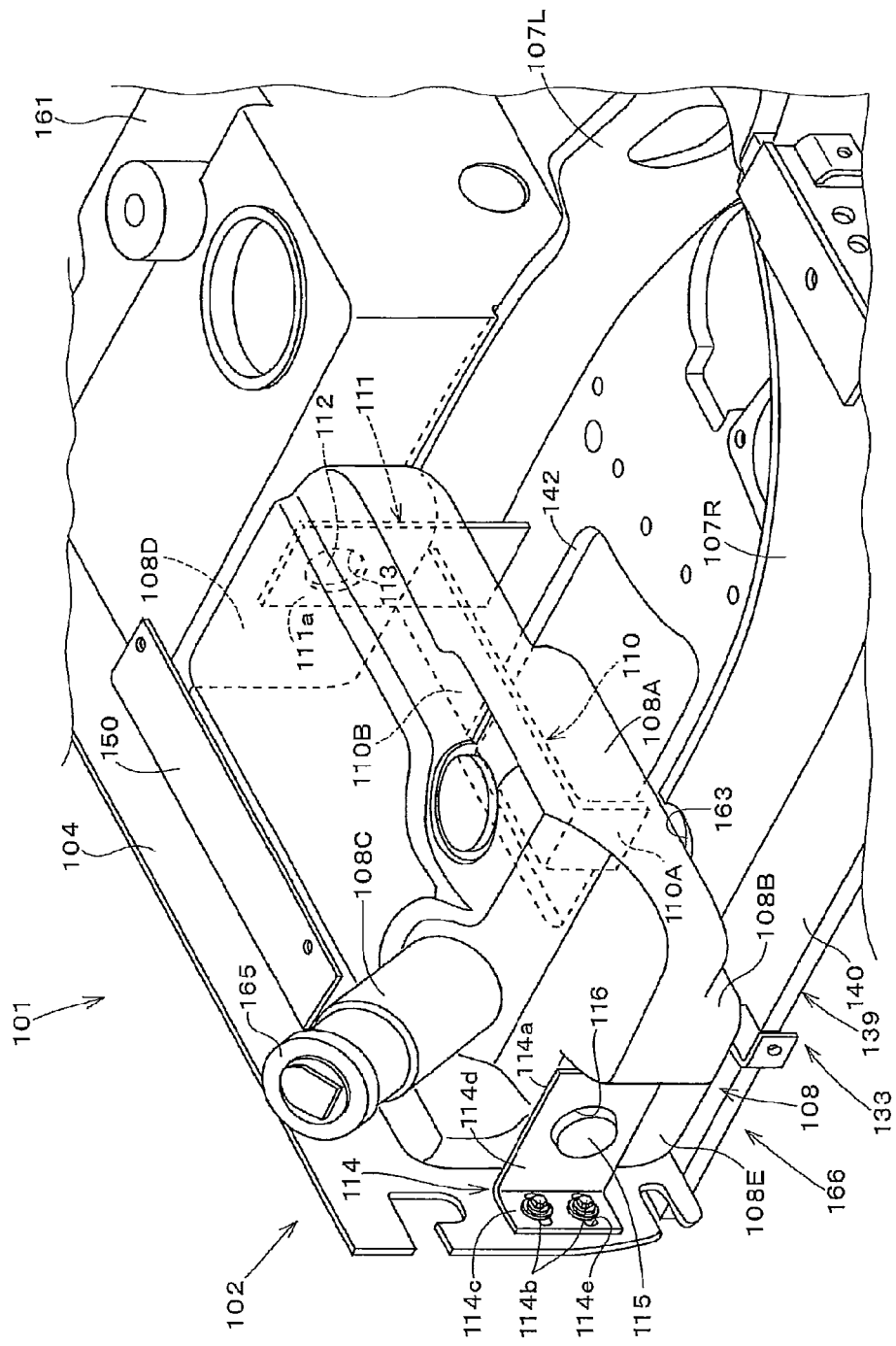
FIG. 8 is a perspective view showing a tank attaching device.
Figure 9:
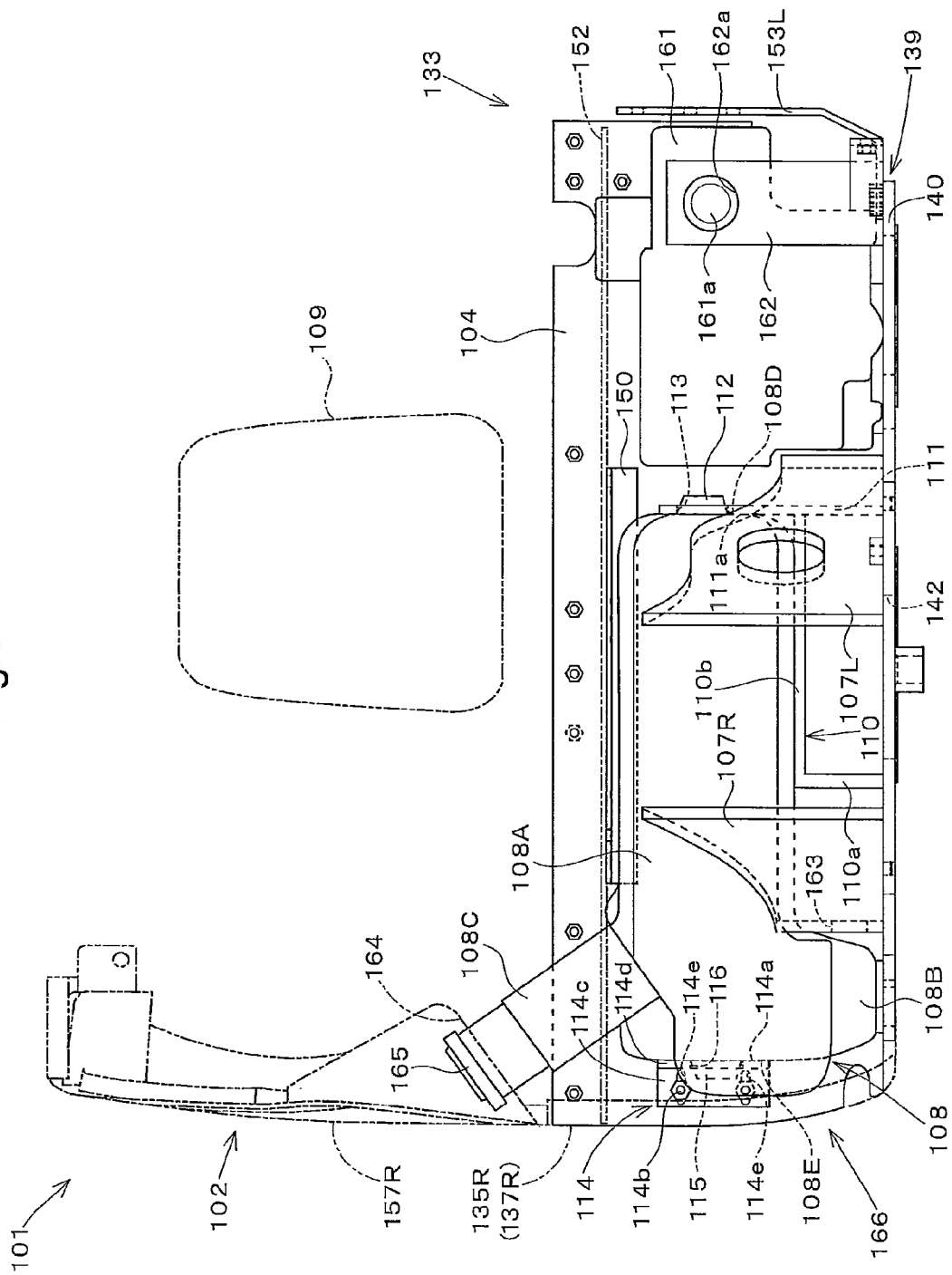
FIG. 9 is a front view of the swivel deck.
Figure 10:
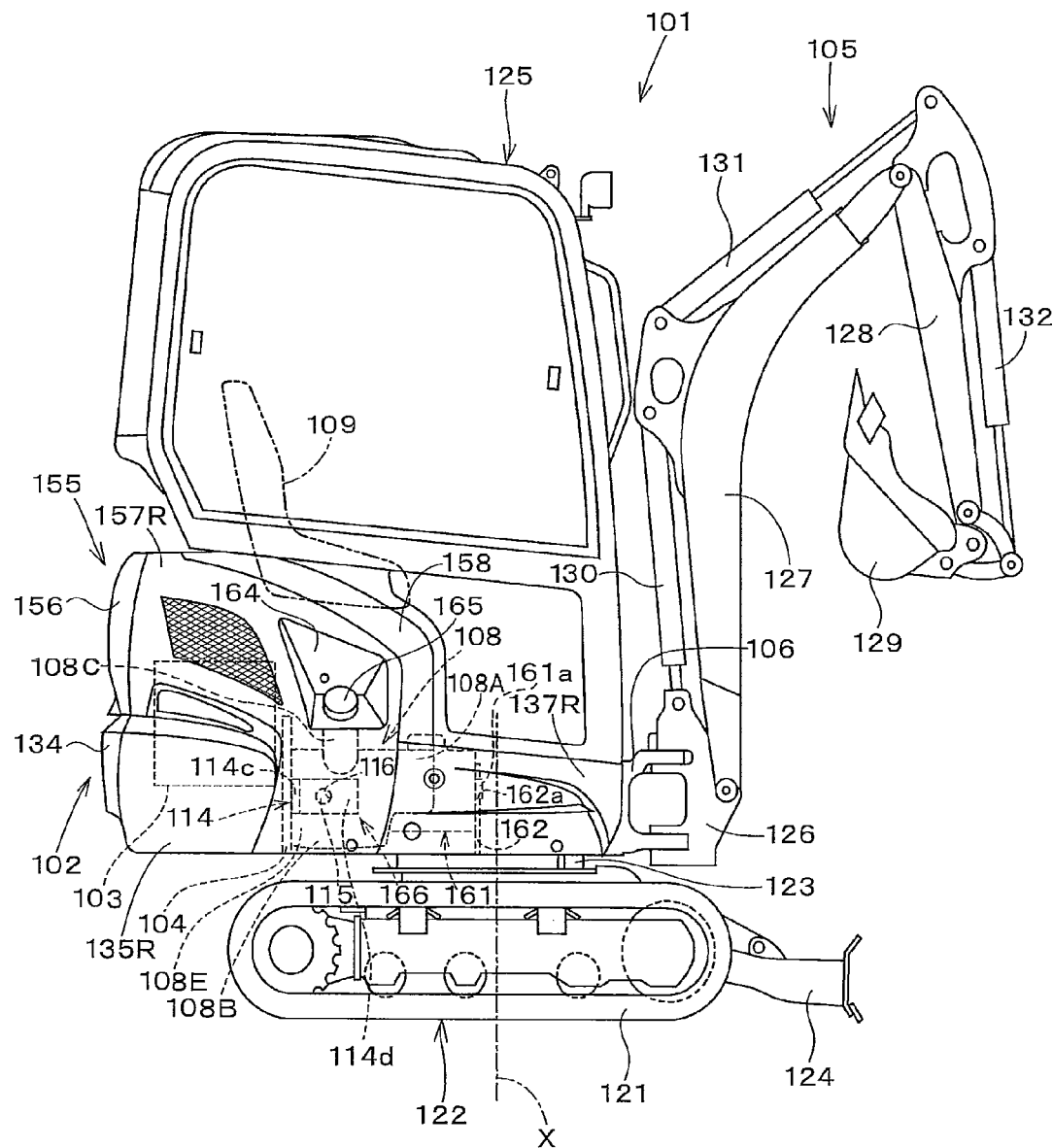
FIG. 10 is a side view of the backhoe.

As shown in FIG. 7 and FIG. 9, the fuel tank 108 is detachably disposed with the right/left longitudinal orientation as seen in its plane view to traverse the one (right one) of the right and left vertical rib 107R forwardly of the partition wall 104. The fuel tank 108 is attached at a position of the partition wall 104 lower than the step attaching plate 150 via a tank attaching device 166 to be described later (see FIG. 8) and is to be accommodated between the swivel base plate 139 and the step 152. Further, the fuel tank 108 extends from one of the right and left ends (left end) of the swivel deck 102 to under a driver's section 109 and the right side of the fuel tank 108 is to be exposed to the outside when a right side cover member 137R, a right side protector 135R and a right hood portion 157R are detached.

The fuel tank 108 includes a main portion 108A formed elongate in the right/left direction, a lower bulging portion 108B bulging downward from the lower face of an outer portion (a portion offset to one right/left side (right side) edge of the swivel frame 133) of the main portion 108A, and an oil feeding cylindrical portion 108C projecting upwardly to the right side from the upper face of the outer portion of the main portion 108A.

Incidentally, the rear upper portion of the right vertical rib 107R across which the fuel tank 108 extends is cut away to be open upwards along the bottom face of the fuel tank 108 (this will be referred to as a "cutaway recess portion 163" hereinafter).

In the right and left side faces (i.e. the back side face 108D and the outer side face 108E) of the main portion 108A of the fuel tank 108, there are respectively formed projecting engaging portions 112, 115 protruding to the right and left outer sides. These back engaging portion 112 and the outer engaging portion 115 are formed as approximately conical projecting portions projecting with tapering from the side face to the right/left outer side. Further, the projecting lengths of the back engaging portion 112 and the outer engaging portion 115 can be either shorter or longer than the thicknesses of a back position setting member 111 and an outer position setting member 114 which will be described later.

The main portion 108A is configured such that the front/rear width of this main portion 108A is shorter than the front/rear length of a cutaway recess portion 163 so that the main portion 108A may be accommodated within this cutaway recess portion 163 defined in the right vertical rib 107R.

The lower bulging portion 108B, on the right outer side of the right vertical rib 107R, has its lower end bulging downward to the vicinity of the swivel base plate 139, so as to increase the capacity of the fuel tank 108 and also not to interfere withdrawal or pressed insertion of the fuel tank 108 from the right side of the swivel deck 102 when the fuel tank 108 is to be replaced.

The oil feeding cylindrical portion 108C has such a projecting length that the leading end thereof is exposed to the outside through an oil feeding recess portion 164 provided in the right hood portion 157R. And, an oil feeding cap 165 is detachably attached to the leading end.

The back portion (the portion located downwardly of the driver's seat 109) of the fuel tank 108 is received by a receiving rack 110 provided on the swivel deck 102. And, on the left side of this receiving rack 110 and between left edge of the opening 142 of the swivel deck 102 and the left vertical rib 117L, there is mounted erect the back position setting member 111. This back position setting member 111 is formed separately from the left vertical rib 107L, but can be formed integral therewith.

The receiving rack 110 is a plate-like member having an approximately L-shape as seen in its front view and includes an erect portion 110a formed erect from the right side of the opening 142 of the swivel deck 102 and a flat plate portion 110b extending substantially horizontally to the left side so as to traverse from the upper end of the erect portion 110a to the opening 142.

This flat plate portion 110b is a plate-like member formed elongate in the right/left direction and its leading end (left end) is connected to a vertical intermediate portion of the back position setting member 111, so that the upper surface of the flat plate portion 110b comes into contact with the bottom portion of the back portion of the fuel tank 108. Therefore, as the fuel tank 108 can be slid smoothly on the flat plate portion 110b, the withdrawal and pressed insertion thereof can be carried out smoothly.

The back position setting member 111 is a flat plate-like member having, on its right side, a face (back contact face) 111a which comes into contact with the back side face 108D of the fuel tank 108 and includes, at a position thereof opposed to the back side face 108D of the fuel tank 108, a back engaged portion 113 to be engaged with the back engaging portion 112.

This back engaged portion 113 is a substantially circular through hole formed at a vertical intermediate portion of the back position setting member 111 and is configured such that a right opening edge thereof may be engaged with the outer peripheral face of the back engaging portion 112 to which the portion is to be engaged. Thus, the back engaged portion 113, as being fitted in (engaged with) the back engaging portion 112, is capable of restrict the front/rear vertical movements of the fuel tank 108 on the back side.

Further, the fuel tank 108 has its lower movement restricted also by the receiving rack 110 and at the same time has its leftward movement restricted by the contact between the back side face 108D and the back position setting member 111. In these ways, by the receiving rack 110 and the back position setting member 111, the fuel tank 108 is fixed in its position in the back side (back) left direction and in the front/rear vertical directions.

In the meantime, as the fuel tank 108 is mounted on the receiving rack 110, it will suffice for the movements thereof restricted at least in the front/rear direction and the upward direction thereof by the engagement between the back engaging portion 112 and the back engaged portion 113.

The outer position setting member 114 is a plate member that is detachably attached to the partition wall 104 and that has a face (outer contact face) 114a which comes into contact with the outer face 108E of the fuel tank 108. The outer position setting member 114 includes an attaching portion 114c detachably attached to the right end portion of the partition wall 104 by a fastener 114b such as a bolt and a rectangular projecting plate portion 114d that projects forwardly from the end portion of the attaching portion 114c and that has the outer contact face 114a on the left side thereof and the outer position setting member 114 as a whole has an approximately L-shape as seen in its plane view.

The attaching portion 114c defines a lateral elongate hole 114e elongate in the right/left direction and by the fastener 114b inserted in this lateral elongate hole 114e, the outer position setting member 114 is attached to the partition wall 104.

The projecting plate portion 114d includes an outer engaged portion 116 to be engaged with the outer engaging portion 115 at the position opposed to the outer side face 108E of the fuel tank 108.

This outer engaged portion 116, like the back side, is also formed as an approximately oval-shaped through hole defined at the center of the projecting plate portion 114d of the outer position setting member 114 and comes into engagement with the outer peripheral face of the outer engaging portion 115 into which as its left opening edge is engaged, this outer engaged portion 116 is capable of restricting the front/rear vertical movements of the fuel tank 108 with engagement of the outer engaging portion 115 therein.

Further, with the downward movement restriction provided by the receiving rack 110 and the right movement restriction by the outer position setting member 114, the fuel tank 108 is fixed in position, on the outer side, in the outer (right) direction, the front/rear and upper/lower directions.

In the meantime, as the fuel tank 108 is mounted on the receiving rack 110, like the back side thereof, it will suffice for the movements thereof restricted at least in the front/rear direction and the upward direction thereof by the engagement between the outer engaging portion 115 and the outer engaged portion 116.

The above-described receiving rack 110, back position setting member 111, back engaging portion 112, back engaged portion 113, outer position setting member 114, outer engaging portion 115 and outer engaged portion 116 together constitute the tank attaching device 166.

Next, the mode of using the tank attaching device 116 in the swivel work machine 101 relating to the present invention will be described.

When the fuel tank 108 of the swivel work machine 101 is to be replaced, first, the right cover member 137R, right side protector portion 135R and right hood portion 157R will be removed.

As shown in FIG. 8, the outer side of the fuel tank 108 is fixed in position by the outer position setting member 114. However, with removal of the fastener 114b at the attaching portion 114c, the fuel tank 108 can be withdrawn to the right outer side of the swivel deck 102.

After the withdrawal, as the fuel tank 108 is inserted again from the right side of the swivel deck 102, the tank 108 will be pushed in to the back side, as being slid with the bottom portion on the back side thereof being mounted on the receiving rack 110, whereby the back engaging portion 112 of the fuel tank 108 can be engaged into the back engaged portion 113 of the back position setting member 111. With engagement between the outer peripheral face of the back engaging portion 112 and the right opening edge of the back engaged portion 113, front/back vertical movements of the fuel tank 108 on the back side are restricted.

During the movement restriction described above, if the back engaging portion 112 is pushed in until it comes into contact with the back contact face 111a of the back position setting member 111, the contact area is increased, so that more reliable position fixing on the back side of the fuel tank 108 is made possible.

Next, the outer engaging portion 115 of the fuel tank 108 will be brought into engagement into the outer engaged portion 116 of the outer position setting member 114, thereby to engage the outer peripheral face of the outer engaging portion 115 into the left opening edge of the outer engaged portion 116. Under this engaged condition, while the outer position setting member 114 is being pressed to the back side of the fuel tank 108, the attaching portion 114c will be attached to the right end portion of the partition wall 104 by the fastener 114b inserted into the lateral elongate hole 114e. With this, the front/rear, upper/lower movements of the fuel tank 108 on its outer side are restricted.

During this movement restriction, similarly with the outer position setting member 114, with a pressing-in operation until the outer face 108E comes into contact with the outer contact face 114a, the contact area is increased so that the fuel tank 108 can be fixed in position and supported in a reliable manner on the outer side also.

Incidentally, simultaneously therewith, the fuel tank 108 has its downward movement restricted also by the receiving rack 110 on which it is received. Further, inspection and replacement of the control valve 160 which is now exposed forwardly of the fuel tank 108 are made possible.

After the attachment of the fuel tank 108, the right side cover member 137R, right protector 135R and right hood portion 157R will be attached to the swivel frame 133.

As described above, forwardly of the partition wall 104 and downwardly of the driver's seat 109, the fuel tank 108 can be inserted or detached from the right side of the swivel deck 102. Therefore, the dead space under the driver's seat 109 can be effectively utilized. And, at the same time, internal instruments such as the control valve 160 can be disposed forwardly of the fuel tank 108, whereby the maintenance facility can be improved.

In the meantime, the present invention is not limited to the embodiment described above. The individual constructions, overall construction, shapes, dimensions of the swivel work machine 101 and so on can be modified appropriately in accordance with the essence of the present invention.

In the swivel work machine 101 described above, the tank attaching device 166 is applied to the fuel tank 108. Instead of this, the device may be applied to the work oil tank 161 or any other tank.

In the foregoing, the fuel tank 108 is disposed on the right side of the swivel deck 102. Instead, the fuel tank may be replaced in its disposition with the work oil tank 161 on the left side, so that the fuel tank 108 may be disposed on the left side of the swivel deck 102.

Further, the fuel tank 108 ma be disposed longitudinally in the right/left direction so as to traverse above both of the right and left vertical ribs 107L, 107R.

A cushioning member can be provided respectively on the swivel base plate 139 in opposition to the bottom face of the lower bulging portion 108B of the fuel tank 108, on the flat plate portion 110b of the receiving rack 110, on the back contact face 111a of the back position setting member 111 and on the outer contact face 114a of the outer position setting member 114.

Further, a downwardly projecting engaging projection portion may be provided at the lower end of the lower bulging portion 108B of the fuel tank 108 and to form, in the swivel base plate 139, an engaged cutaway portion which is open on the right side. With this, movements of the fuel tank 108 in the front/rear, left and downward directions are restricted, thus making stronger position fixing of the fuel tank 108 possible.

In the foregoing, the outer position setting member 114 is attached to the partition wall 104. Instead, this member 114 may be detachably attached to the swivel base plate 139.

Moreover, in the foregoing embodiment, the two engaging portions 112, 115 of the fuel tank 108 are formed as projections. Instead, these engaging portions 112, 115 of the fuel tank 108 may be formed as recesses. In this case, the two engaged portions 113, 116 will be formed as projections.

The battery 148 may be disposed on the further forward side of the control valve 160 which is located forwardly of the fuel tank 108.

The invention claimed is:

1. A swivel frame for a swivel work machine, comprising:
   a swivel base plate supported on a traveling machine body to be pivotable about a swivel axis and mounting an engine at a rear portion thereof;
   a support bracket provided at a front end of the swivel base plate for supporting an excavator;
   a partition wall provided on the swivel base plate for partitioning space forwardly of the engine in the fore/aft direction; and
   a pair of right and left vertical ribs provided on the swivel base plate for interconnecting the support bracket and the partition wall;
   wherein said swivel base plate is divided into a rear plate portion on the rear side thereof and a front plate portion on the front side thereof, the rear plate portion being formed of a plate thinner than the front plate portion;
   said rear plate portion and said front plate portion are fixedly connected to each other in such in a manner that upper surfaces thereof are flush each other;
   a rear portion of said front plate portion projects more rearward than said partition wall;
   a pair of vertical walls are formed on and project from said rear plate portion; and
   front portions of said pair of vertical walls project more forward than said rear plate portion and are fixedly attached to the rear portion of said front plate portion and said partition wall.

2. The swivel frame for a swivel work machine according to claim 1, wherein a rear end of said rear plate portion is bent to form an erect wall, to which rear ends of said vertical walls are fixedly attached.

3. The swivel frame for a swivel work machine according to claim 2, wherein at front and rear opposed ends of said pair of right and left vertical walls, there are formed engine mounting portions, with a front end of the front engine mounting portion being fixedly attached to said partition wall and with a rear end of the rear engine mounting portion being fixedly attached to said erect wall.

4. The swivel frame for a swivel work machine according to claim 3, wherein a connecting portion of the left vertical rib to be connected to said partition wall and a fixedly attaching portion of the engine mounting portion of the left vertical wall to be fixedly attached to said partition wall are overlapped with each other in the right/left direction; and
   a connecting portion of the right vertical rib to be connected to said partition wall and a fixedly attaching portion of the engine mounting portion of the right vertical wall to be fixedly attached to said partition wall are overlapped with each other in the right/left direction.

* * * * *

UNITED STATES PATENT AND TRADEMARK OFFICE
CERTIFICATE OF CORRECTION

PATENT NO.         : 8,267,217 B2
APPLICATION NO.    : 12/886875
DATED              : September 18, 2012
INVENTOR(S)        : Satoru Kotani et al.

It is certified that error appears in the above-identified patent and that said Letters Patent is hereby corrected as shown below:

Title page, Item (57) Abstract, Line 15, delete "in a" and insert -- a --

Column 12, Line 6, Claim 1, delete "in a" and insert -- a --

Signed and Sealed this
Twenty-fifth Day of December, 2012

David J. Kappos
*Director of the United States Patent and Trademark Office*